(12) United States Patent
Xu et al.

(10) Patent No.: US 11,185,904 B2
(45) Date of Patent: Nov. 30, 2021

(54) DIFFERENTIAL TEMPERATURE PUSH BENDING METHOD AND DEVICE FOR TUBE WITH SMALL BENDING RADIUS

(71) Applicant: Nanchang Hangkong University (NCHU), Jiangxi (CN)

(72) Inventors: Xuefeng Xu, Jiangxi (CN); Yubin Fan, Jiangxi (CN); Chunlin Fu, Jiangxi (CN)

(73) Assignee: Nanchang Hangkong University (NCHU), Nanchang (CN)

( * ) Notice: Subject to any disclaimer, the term of this patent is extended or adjusted under 35 U.S.C. 154(b) by 331 days.

(21) Appl. No.: 16/217,020

(22) Filed: Dec. 11, 2018

(65) Prior Publication Data
US 2019/0224736 A1 Jul. 25, 2019

(30) Foreign Application Priority Data
Jan. 22, 2018 (CN) .......................... 201810060245.1

(51) Int. Cl.
*B21D 7/16* (2006.01)
*B21D 7/08* (2006.01)
(Continued)

(52) U.S. Cl.
CPC .............. *B21D 7/162* (2013.01); *B21D 7/085* (2013.01); *B21D 9/125* (2013.01); *B21D 9/15* (2013.01);
(Continued)

(58) Field of Classification Search
CPC . B21D 7/085; B21D 9/01; B21D 9/03; B21D 9/12; B21D 9/125; B21D 9/15;
(Continued)

(56) References Cited

U.S. PATENT DOCUMENTS

| | | | |
|---|---|---|---|
| 1,996,838 A | * | 4/1935 | Snell ........................ B21D 9/12 72/128 |
| 2,701,002 A | * | 2/1955 | Arbogast ................ B21C 37/28 72/57 |

(Continued)

FOREIGN PATENT DOCUMENTS

| | | |
|---|---|---|
| CN | 102554009 B | 11/2014 |
| CN | 204338634 U | 5/2015 |

(Continued)

*Primary Examiner* — Adam J Eiseman
*Assistant Examiner* — Fred C Hammers

(57) ABSTRACT

Disclosed are differential temperature push bending method and device for tube with small bending radius, the device comprising: a push bending die, core, fillers and pushers, wherein the core and the fillers are both arranged in a bending chamber of the push bending die, an inlet and an outlet end of the push bending die are respectively provided with a front guiding sleeve and a rear guiding sleeve, the pusher in the front guiding sleeve abuts against a plurality of fillers, and the pusher in the rear guide sleeve abuts against the core. A heat rod is provided at an outer end of the bending chamber. The present disclosure adopts differential temperature type push bending, flow performance of the tube blank at the outer corner of the die can be improved, and the material can be timely fed to prevent excessive stretching and thinning of the outer material.

3 Claims, 3 Drawing Sheets

(51) Int. Cl.
  *B21D 9/15* (2006.01)
  *B21D 9/18* (2006.01)
  *B21D 37/16* (2006.01)
  *B21D 9/12* (2006.01)
  *B21D 37/18* (2006.01)

(52) U.S. Cl.
  CPC .............. *B21D 9/18* (2013.01); *B21D 37/16* (2013.01); *B21D 37/18* (2013.01)

(58) Field of Classification Search
  CPC .......... B21D 7/16; B21D 7/162; B21D 7/165; B21D 9/18; B21D 37/16
  See application file for complete search history.

(56) References Cited

U.S. PATENT DOCUMENTS

| | | | | |
|---|---|---|---|---|
| 2,946,369 | A * | 7/1960 | Biggs | B22F 3/00 72/373 |
| 2,971,556 | A * | 2/1961 | Armstrong | B21D 9/03 72/42 |
| 3,328,996 | A * | 7/1967 | Pin | B21C 37/28 72/301 |
| 3,533,266 | A * | 10/1970 | Anderson | B21D 9/08 72/298 |
| 3,922,134 | A * | 11/1975 | Kupfrian | B29C 33/505 425/292 |
| 4,352,285 | A * | 10/1982 | LaRue | B21D 11/00 72/398 |
| 5,697,155 | A * | 12/1997 | Bloecker | B21C 37/292 29/421.1 |
| 6,941,787 | B2 * | 9/2005 | Flehmig | B21D 9/01 72/150 |
| 7,127,928 | B2 * | 10/2006 | Nakazato | B21D 9/073 72/295 |
| 8,919,171 | B2 * | 12/2014 | Tomizawa | B21B 1/00 72/369 |
| 2008/0066517 | A1 * | 3/2008 | Tomizawa | B21D 7/08 72/364 |
| 2017/0182538 | A1 * | 6/2017 | Polo | B21D 7/16 |
| 2017/0197237 | A1 * | 7/2017 | Okada | B21D 7/12 |
| 2018/0154415 | A1 * | 6/2018 | Abbasi | B21D 9/01 |

FOREIGN PATENT DOCUMENTS

| | | |
|---|---|---|
| CN | 104438433 B | 8/2016 |
| CN | 105537342 B | 10/2017 |

* cited by examiner

DIFFERENTIAL TEMPERATURE PUSH BENDING METHOD AND DEVICE FOR TUBE WITH SMALL BENDING RADIUS

CROSS-REFERENCE TO RELATED APPLICATIONS

This application claims the benefit of priority from Chinese Application No. 201810060245.1, filed on Jan. 22, 2018. The entire contents of the aforementioned applications, including any intervening amendments thereto, are incorporated herein by reference.

TECHNICAL FIELD

The present disclosure relates to the technical field of push bending of tube, in particular to differential temperature push bending method and device for tube with small bending radius.

BACKGROUND

In modern aviation, aerospace, automotive industry, etc., in order to achieve weight reduction and save effective space, tubes that are integrally formed and have small bending radius are used. Upon bending with small bending radius of the tube, the outer side of the rounded corner is stretched and the inner side pressed. As shown in FIG. 1, the smaller the radius r of the inner circle, the larger the deformation of the rounded area. In this case, the material at the inner side of the tube is likely to accumulate and wrinkle, and the material at the outer side is subjected to tensile stress and thinned or even broken. Therefore, using existing tube bending methods, it is difficult to bend a tube having a relative bending radius less than or equal to the tube diameter.

Tube push bending is a bending method for pushing a tube blank filled with fillers into a bending die, and is generally used for bending a 90° tube bend having a relative bending radius R equal to the tube diameter D (R≤D).

However, at present, constant temperature is used for push bending. In order to improve the push bending performance and to bend the tube with a bending radius of less than the tube diameter, the present disclosure proposes a differential temperature push bending method and device for tube with small bending radius, which has important engineering significance.

SUMMARY

The object of the present disclosure is to provide a differential temperature push bending method and device for tube with small bending radius, which adopts a differential temperature type push bending method, wherein the outer side of the die bending chamber is heated by a heating rod and the inner side of the die bending chamber is cooled by cooling water to form a die differential temperature, so that the performance of different parts of the tube blank during the bending process is improved.

To achieve the above object, the present disclosure provides the following technical solutions.

The present disclosure provides a differential temperature push bending device for tube with small bending radius, including: a push bending die, cores, a filler and pushers, wherein the cores and the filler are both arranged in a bending chamber of the push bending die, an inlet of the push bending die is provided with a front guiding sleeve, an outlet end of the push bending die is provided with a rear guiding sleeve, an end of at an outer side of the bending chamber of the push bending die is provided with a heating rod, an end at an inner side of the curved bending chamber of the push bending die is provided with a cooling water channel, a first thermocouple is disposed near the heating rod, a second thermocouple is disposed near the cooling water channel, the pusher in the front guiding sleeve abuts against the filler, and the pusher in the rear guide sleeve abuts against the cores.

Preferably, the heating rod is disposed on an outer arc side of the curved bending chamber, and the heating rod is vertically disposed related to a tangent of the outer arc of the curved bending chamber, and the heating rod is provided in at least one.

Preferably, the cooling water channel is disposed on an inner arc side of the curved bending chamber, and cooling segments of the cooling water channel are distributed along the inner arc of the curved bending chamber.

Preferably, the filler is rubber cylindrical blocks having a hardness of 80 to 85 A Shore hardness and a thickness of 7 to 10 mm, and the rubber cylindrical blocks are made of fluororubber or perfluoroether rubber.

Preferably, the number of the cores is at least three, and the cores are uniformly distributed in the curved bending chamber.

The present disclosure further provides a method for achieving differential temperature push bending for tube with small bending radius using the device according to claim 1, including the steps of:

step 1: blanking and chamfering a tube blank;

blanking a tube blank having a length of m, the length m being much larger than πD, chamfering a front end at a curved inner side of the tube having the length of m at an oblique angle of 30° to 45°, chamfering a rear end of the curved inner side of the tube blank that is in contact with the pushers at an oblique angle of 45° to 60°, then cutting a slope of the pushed end of the tube blank along a center line of the tube blank, and finally deburring two ends of the tube blank and cleaning the inner and outer sides of the tube blank;

step 2: spraying a lubricant on the outer side of the tube blank;

applying a lubricant to the tube blank, the lubricant being a high temperature resistant lubricant;

step 3: filling the tube blank with rubber filler;

filling the filler having a hardness of 80 to 85 A Shore hardness inside the pushed end of the tube blank, the filler being rubber cylindrical blocks, each of the rubber cylindrical blocks having a diameter that is 2 mm smaller than an inner diameter of the tube blank;

step 4: energizing the heating rod to heat the push bending die;

energizing the heating rod, the heating rod heating the push bending die to a set temperature and keeping a temperature after heating constant, the set temperature being 200-400° C., and a variance of the temperature after heating being less than 2° C.; a deformation temperature of the tube blank being increased, so that a plasticity of an outer tube structure during a bending process is improved;

step 5: circulating water in the cooling water channel to cool the push bending die;

injecting cooling water into the cooling water channel provided in the push bending die, heat inside the die being taken away by a flow of the cooling water to lower a temperature inside the die, and an initial water temperature of the cooling water being room temperature;

step 6: push bending the tube blank;

after a first thermocouple and a second thermocouple detecting a differential temperature between the inner and outer sides of the push bending die is 100-300° C., placing the tube blank in the push bending die, ensuring that the pushers and the cores are fixed in an initial position, increasing a thrust on a top of the cores, providing sufficient internal pressure in the tube by the filler, forcing the material to flow massively towards a front groove, the tube blank moving forward at a constant speed by the thrust of the pushers, while the cores moving backwards, thus gradually completing the bending of tube with small bending radius for the tube blank;

step 7: removing the surface lubricant;

after the bending being completed, removing the lubricant on a surface of the tube blank.

Preferably, in the step 3, a bending temperature of the tube blank is determined according to the fluororubber cylindrical blocks or perfluoroether rubber cylindrical blocks.

Preferably, in the step 6, a moving distance of the pushers is πD.

Compared with the prior art, the present disclosure achieves the following technical effects:

1. The present disclosure adopts differential temperature type push bending, and the heating rod and the cooling water channel are arranged on two sides of the push bending part of the push bending die. The die is heated first and then cooled, and the existing normal temperature push bending is changed, so that the temperature rise outside the die makes the outer side of the tube blank at a higher bending temperature in the bending process so as to achieve good plasticity. In this way, flow performance of the tube blank at the outer corner of the die can be improved, and the material can be timely fed to prevent excessive stretching and thinning of the outer material during push bending of a tube with a small bending radius and thus avoid defect such as cracking.

2. The temperature of the inner side of the push bending die of the present disclosure is reduced by cooling, so that the tube blank gains a certain deformation strength during bending, thereby resisting the compressive stress received at the inner round corner of the tube blank during the bending process, and preventing the occurrence of defects such as stacking and wrinkling at the inner side of the rounded corner of the tube blank.

BRIEF DESCRIPTION OF THE DRAWINGS

In order to more clearly illustrate the embodiments of the present disclosure or the technical solutions in the prior art, the drawings to be used in the embodiments will be briefly described below. Obviously, the drawings in the following description are only some embodiments of the present disclosure. For those skilled in the art, other drawings may be obtained from these drawings without any inventive labor.

Among them, 1—heating rod, 2—cores, 3—push bending die, 4—rear guiding sleeve, 5—cooling water channel, 6—tube blank, 7—front guiding sleeve, 8—filler, 9—pusher, 10—first thermocouple, 11—second thermocouple.

DETAILED DESCRIPTION OF EMBODIMENTS

The technical solutions in the embodiments of the present disclosure are clearly and completely described in the following with reference to the accompanying drawings in the embodiments of the present disclosure. It is obvious that the described embodiments are only a part of the embodiments of the present disclosure, not all embodiments. All other embodiments obtained by a person of ordinary skill in the art based on the embodiments of the present disclosure without departing from the inventive scope are within the scope of the present disclosure.

The object of the present disclosure is to provide a differential temperature push bending method and device for tube with small bending radius, which adopts a differential temperature type push bending method, wherein the outer side of the die bending chamber is heated by a heating rod and the inner side of the die bending chamber is cooled by cooling water to form a die differential temperature, so that the performance of different parts of the tube blank during the bending process is improved.

The present disclosure will be further described in detail with reference to the drawings and specific embodiments.

Figure 1:
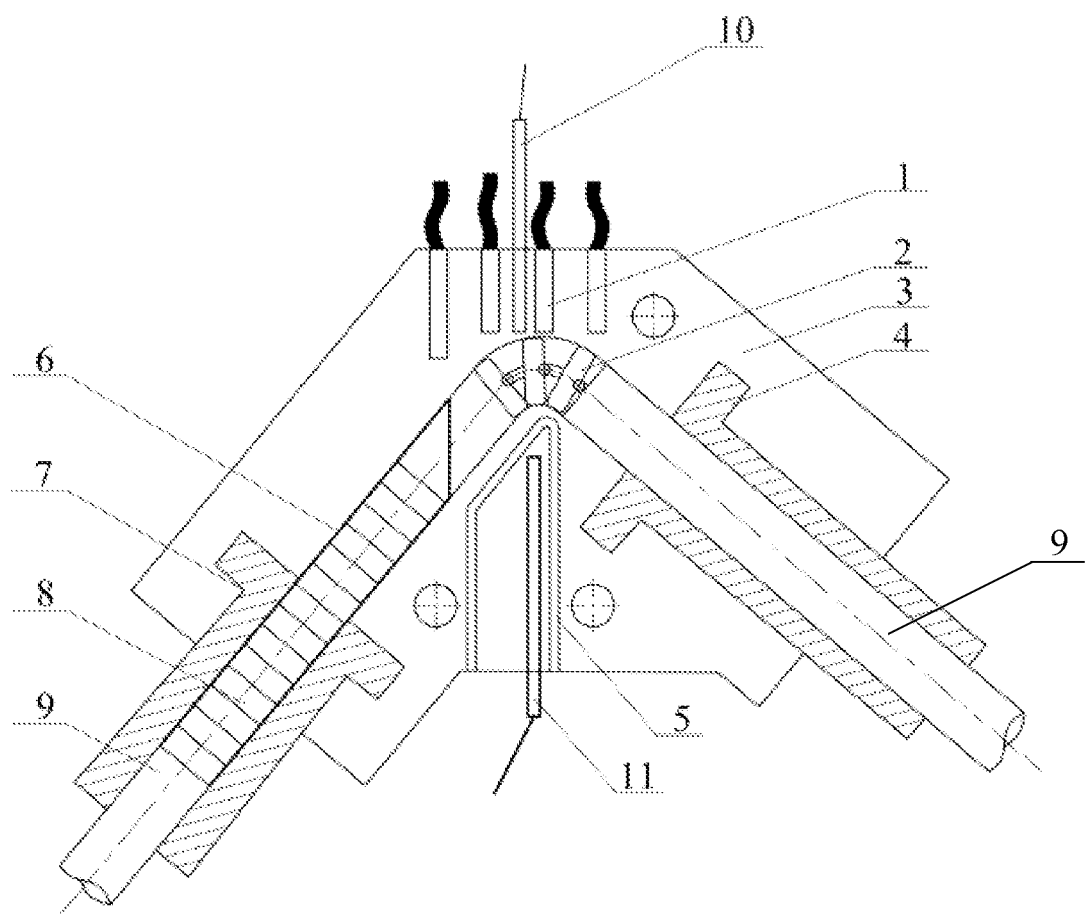
FIG. 1 is a schematic view of a differential temperature push bending device for tube with small bending radius according to an embodiment of the present disclosure.

As shown in FIG. 1, the embodiment provides a differential temperature push bending device for tube with small bending radius, including: a push bending die 3, cores 2, filler 8 and pushers 9, wherein the cores 2 and the filler 8 are both arranged in a bending chamber of the push bending die 3, an inlet of the push bending die 3 is provided with a front guiding sleeve7, an outlet end of the push bending die is provided with a rear guiding sleeve 4, an end of at an outer side of the bending chamber of the push bending die 3 is provided with a heating rod 1, an end at an inner side of the curved bending chamber of the push bending die 3 is provided with a cooling water channel 5, a first thermocouple 10 is disposed near the heating rod 1, a second thermocouple 11 is disposed near the cooling water channel 5, the pusher 9 in the front guiding sleeve 7 abuts against filler 8, and the pusher 9 in the rear guide sleeve 4 abuts against the cores 2. The cores 2 are evenly distributed in the curved bending chamber. The number of the cores 2 of the embodiment is three. Using the cores 2, it is possible to avoid defects such as wrinkles in the tube during the bending process of the tube blank 6.

Specifically, the curved bending portion of the push bending die 3 is divided into inner and outer sides, where the inner side is a pressing end, and the outer side is a tensile end. The tube blank 6 is pushed and bend in the bending chamber, and the bending chamber is divided into curved inner arc and an outer arc, where the inner arc is on the same side as the inner pressing end, and the outer arc is on the same side as the outer stretching end. The heating rod 1 is disposed on the outer arc side of the curved bending chamber. The heating rod 1 is vertically disposed related to a tangent of the outer arc of the curved bending chamber, and the heating rod 1 in this embodiment is provided in six, and is evenly distributed between the outer stretching end and the outer arc of the push bending die 3. The first thermocouple 10 is disposed between the six heating rods 1, the first thermocouple 10 is used for detecting the temperature between the outer arc and the tensile end; the second thermocouple 11 is used for detecting the temperature around the cooling water channel 5. The cooling water channel 5 is disposed on an inner arc side of the curved bending chamber, and cooling segments of the cooling water channel 5 are distributed along the inner arc of the curved bending chamber, where the cooling segments are distributed cooling tubes. The second thermocouple 11 is disposed between the cooling tubes, and the temperatures on both sides of the push bending die 3 are detected simultaneously by the first thermocouple 10 and the second thermocouple 11, differential temperature on both sides are calculated, and it is determined whether to perform push bending of the tube blank according to this differential temperature. The present embodiment reduces the temperature by cooling so that the tube blank 6 is hardened with a certain strength during the bending, thereby resisting the compressive stress applied to the inner rounded corner of the tube blank 6 during the bending process, and preventing occurrence of defect such as stacking and wrinkles at the inner side of the rounded corner of the tube blank 6.

Whether the above-mentioned bending operation of the tube blank 6 is carried out needs to be determined according to the differential temperature between the two sides of the bend end of the push bending die 3, wherein the differential temperature is 100 to 300° C., and different differential temperatures are selected for push bending according to the material of the tube blank 6. For example, in the case that the material of the tube blank 6 is an aluminum alloy, when the differential temperature of the push bending die 3 reaches 100° C., the push bending of the aluminum alloy tube blank can be performed, and in the case that the material of the tube blank 6 is a high-temperature alloy, when the differential temperature of the push bending die 3 reaches 300° C., the push bending of the high temperature alloy tube blank can be performed. In this embodiment, the temperature rise outside the push bending die 3 makes the outer side of the tube blank 6 at a higher bending temperature in the bending process so as to achieve good plasticity. In this way, flow performance of the tube blank 6 at the outer corner of the die can be improved, and the material can be timely fed to prevent excessive stretching and thinning of the outer material during push bending of a tube with a small bending radius and thus avoid defect such as cracking.

In this embodiment, the filler is rubber cylindrical blocks having a hardness of 80 to 85 A Shore hardness and a thickness of 7 to 10 mm, and the rubber cylindrical blocks are made of fluororubber or perfluoroether rubber. Since the push bending die 3 is controlled by differential temperature, the filler 8 is made of high temperature resistant rubber. The filler 8 material used in this embodiment is a fluororubber or a perfluoroether rubber. The fluororubber can be used for a long time below 250° C., and the perfluoroether rubber can be used for a long time below 300° C. Both of the above rubbers can be used as the filler 8 in the present disclosure.

Figure 2:
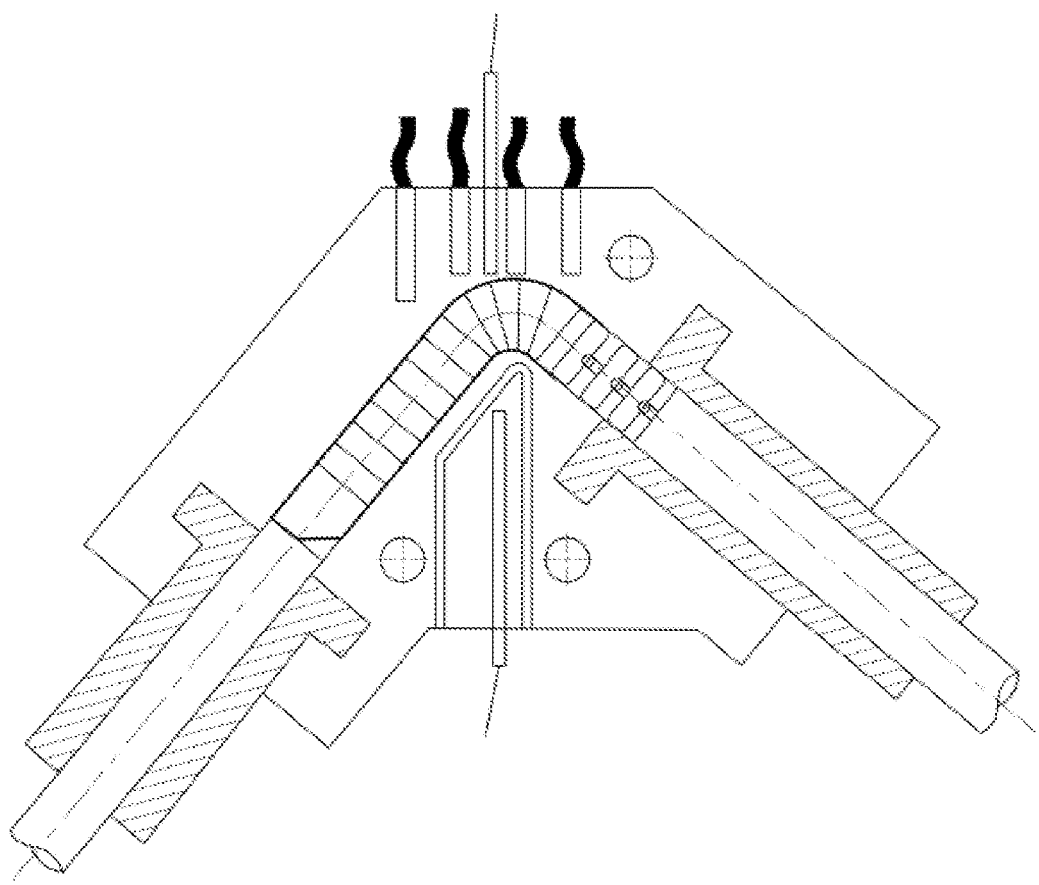
FIG. 2 is a schematic view of a differential temperature push bending process for tube with small bending radius according to an embodiment of the present disclosure.
Figure 3:
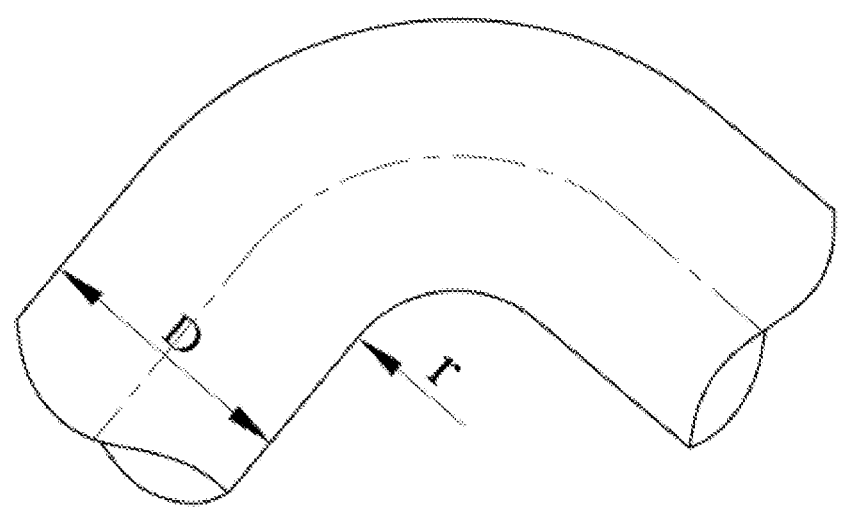
FIG. 3 is a view showing a tube material after a differential temperature push bending process for tube with small bending radius according to an embodiment of the present disclosure.

The embodiment also provides a differential temperature push bending method for tube with small bending radius, including the steps of:

step 1: blanking and chamfering a tube blank 6;

blanking a tube blank having a length of m, the length m being much larger than πD, chamfering a front end at a curved inner side of the tube blank 6 having the length of m at an oblique angle of 30° to 45°, chamfering a rear end of the curved inner side of the tube blank 6 that is in contact with the pushers 9 at an oblique angle of 45° to 60°, then cutting and flattening a slope of the pushed end of the tube blank along a center line of the tube blank 6, and finally deburring two ends of the tube blank 6 and cleaning the inner and outer sides of the tube blank 6;

step 2: spraying a lubricant on the outer side of the tube blank 6;

applying a lubricant to the tube blank 6, the lubricant being a high temperature resistant lubricant;

step 3: filling the tube blank 6 with rubber filler 8;

filling the filler 8 having a hardness of 80 to 85 A Shore hardness inside the pushed end of the tube blank 6, the filler 8 being rubber cylindrical blocks, each of the rubber cylindrical blocks having a diameter that is 2 mm smaller than an inner diameter of the tube blank 6, whether to use fluororubber or perfluoroether rubber being determined by the bending temperature of the tube blank 6;

step 4: energizing the heating rod 1 to heat the push bending die 3;

energizing the heating rod 1, the heating rod 1 heating the push bending die 3 to a set temperature and keeping a temperature after heating constant, the set temperature being 200-400° C., and a variance of the temperature after heating being less than 2° C.; a deformation temperature of the tube blank 6 being increased, so that a plasticity of an outer tube structure during a bending process is improved; since the bending temperature of the tube blank 6 is increased so that the plasticity of an outer tube blank 6 structure during a bending process is improved, flow performance of the tube blank at the outer corner of the die can be improved, and the material can be timely fed to prevent excessive stretching and thinning of the outer material during push bending of a tube with a small bending radius and thus avoid defect such as cracking.

step 5: circulating water in the cooling water channel 5 to cool the push bending die3;

injecting cooling water into the cooling water channel 5 provided in the push bending die3, heat inside the die being taken away by a flow of the cooling water to lower a temperature inside the die, and an initial water temperature of the cooling water being room temperature; heat inside the push bending die 3 is taken away by a flow of the cooling water to lower a temperature inside the die, the strength of the material is enhanced to resist the compressive stresses received during the forming process, preventing the material from stacking and wrinkling;

step 6: push bending the tube blank 6;

as shown in FIG. 2, selecting different differential temperatures for push bending according to different materials of the tube blank 6, after a first thermocouple 10 and a second thermocouple 11 detecting a differential temperature between the inner and outer sides of the push bending die 3 is 100-300° C., placing the tube blank 6 in the push bending die 3, ensuring that the pushers 9 and the cores 2 are fixed in an initial position, increasing a thrust on a top of the cores 2, providing sufficient internal pressure in the tube by the filler 8, forcing the material to flow massively towards a front groove, the tube blank 6 moving forward at a constant speed by the thrust of the pushers 9, while the cores 2 moving backwards, the moving distance of the pushers being πD, thus gradually completing the bending of tube with small bending radius for the tube blank 6;

step 7: removing the surface lubricant;

As shown in FIG. 3, after completion of the bending, removing the lubricant on the surface of the tube blank 6, and finally obtaining a bend tube with small bending radius.

The present disclosure adopts differential temperature type push bending, and the heating rod and the cooling water channel are arranged on two sides of the push bending part of the push bending die. The die is heated first and then cooled, and the existing normal temperature push bending is changed, so that the temperature rise outside the die makes the outer side of the tube blank at a higher bending temperature in the bending process so as to achieve good plasticity. In this way, flow performance of the tube blank at the outer corner of the die can be improved, and the material can be timely fed to prevent excessive stretching and thinning of the outer material during push bending of a tube with a small bending radius and thus is advantageous for bending of pieces having small bending radius.

The principles and embodiments of the present disclosure are described in the detailed description of the present disclosure. The embodiments is described only for a better understanding of the method and the essential concept of the present disclosure. Meanwhile, for those skilled in the art, based on the concept of the present disclosure, the specific embodiments and applications can be varied. In conclusion, the contents of the present specification are not to be construed as limiting the present disclosure.

What is claimed is:

1. A method for achieving differential temperature push bending for tube with small bending radius using a device comprising: a push bending die, cores, a filler and pushers, wherein the cores and the filler are both arranged in a curved bending chamber of the push bending die, an inlet of the push bending die is provided with a front guiding sleeve, an outlet end of the push bending die is provided with a rear guiding sleeve, an end of at an outer side of the bending chamber of the push bending die is provided with a heating rod, an end at an inner side of the curved bending chamber of the push bending die is provided with a cooling water channel, a first thermocouple is disposed near the heating rod, a second thermocouple is disposed near the cooling water channel, a first pusher in the front guiding sleeve abuts against the filler, and a second pusher in the rear guide sleeve abuts against the cores, the method comprising the steps of:

step 1: blanking a tube blank, a length of the tube blank being larger than πD, chamfering a front end at a curved inner side of the tube blank at an oblique angle of 30° to 45°, chamfering a rear end of the curved inner side of the tube blank that is in contact with the first pusher at an oblique angle of 45° to 60°, then cutting and flattening a slope of a pushed end of the tube blank along a center line of the tube blank, and finally deburring two ends of the tube blank and cleaning the inner and outer sides of the tube blank;

step 2: applying a lubricant to the tube blank, the lubricant being a high temperature resistant lubricant;

step 3: filling the filler having a hardness of 80 to 85 A Shore hardness inside the pushed end of the tube blank, the filler being rubber cylindrical blocks, each of the rubber cylindrical blocks having a diameter that is 2 mm smaller than an inner diameter of the tube blank;

step 4: energizing the heating rod, the heating rod heating the push bending die to a set temperature and keeping a temperature after heating constant, the set temperature being 200-400° C., and a variance of the temperature after heating being less than 2° C.; a deformation temperature of the tube blank being increased, so that a plasticity of an outer tube structure during a bending process is improved;

step 5: injecting cooling water into the cooling water channel provided in the push bending die, heat inside the push bending die being taken away by a flow of the cooling water to lower a temperature inside the push bending die, and an initial water temperature of the cooling water being room temperature;

step 6: after the first thermocouple and the second thermocouple detecting a differential temperature between an inner side and an outer side of the push bending die is 100-300° C., placing the tube blank in the push bending die, ensuring that the pushers and the cores are fixed in an initial position, increasing a thrust on a top of the core, providing an internal pressure in the tube blank by the fillers, forcing a material of the tube blank to flow towards a front groove, the tube blank moving forward at a constant speed by the thrust of the pusher, while the cores moving backwards, thus gradually completing the bending of tube blank with small bending radius for the tube blank;

step 7: after the bending being completed, removing the lubricant on a surface of the tube blank.

2. The method according to claim 1, wherein in the step 3, whether to use fluororubber or perfluoroether rubber is determined by the bending temperature of the tube blank.

3. The method according to claim 1, wherein in the step 6, a moving distance of the pushers is πD.

* * * * *